Nov. 4, 1941.    R. W. DE LANCEY    2,261,234
FUEL FEED CONTROL
Filed Aug. 17, 1939    2 Sheets-Sheet 1
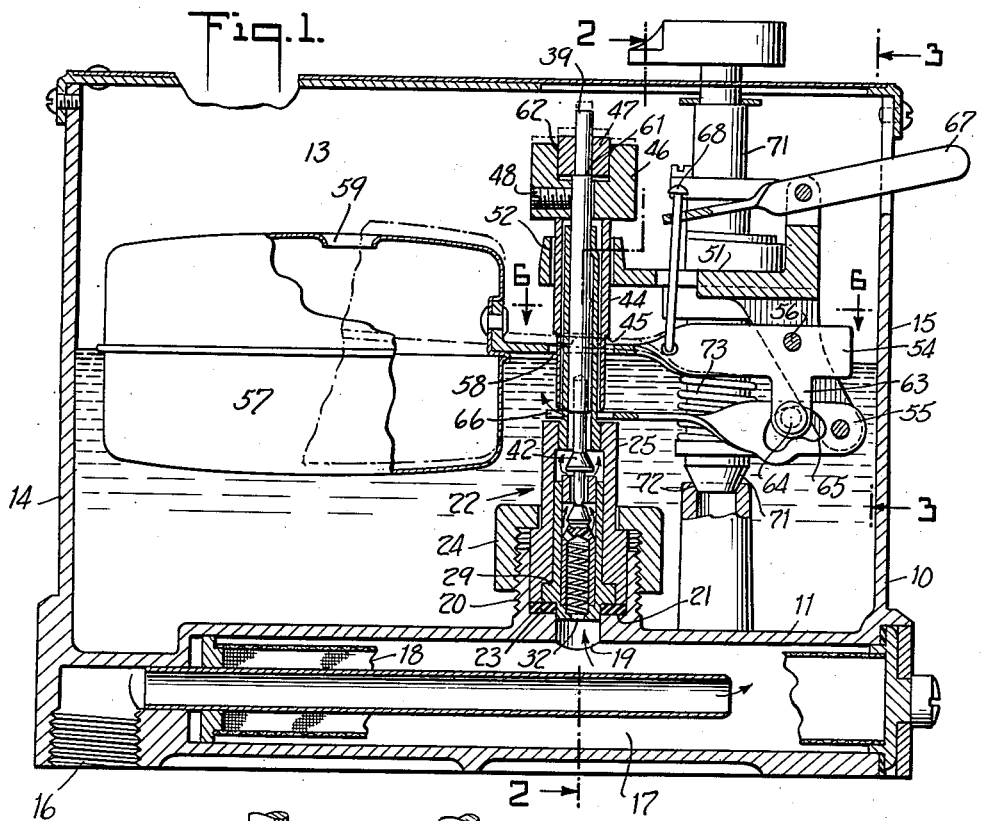
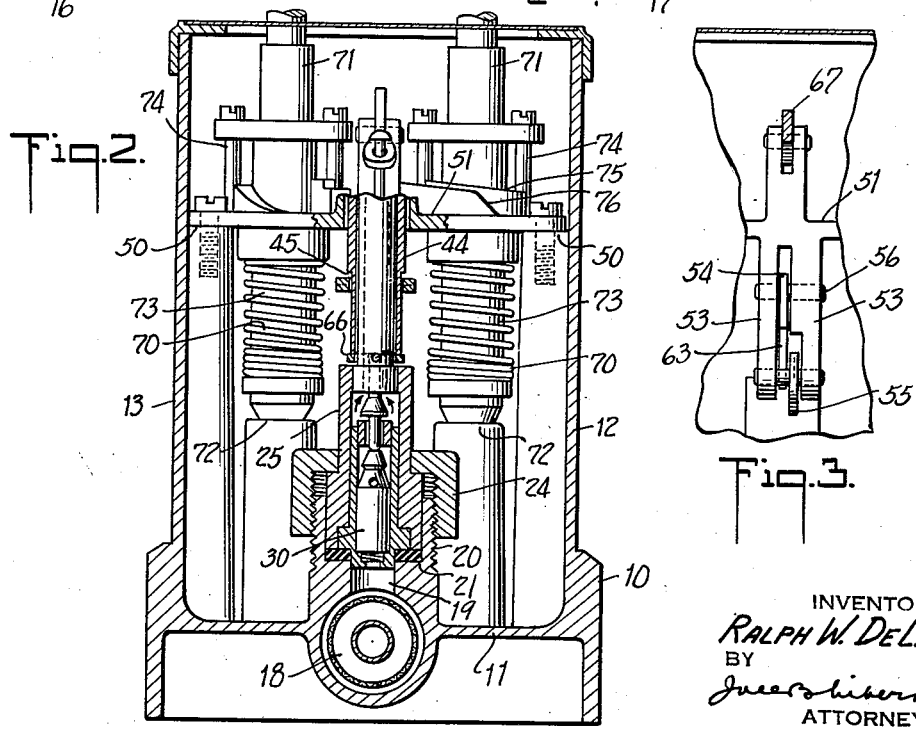
INVENTOR
RALPH W. DE LANCEY
BY
*Jules Lieberman*
ATTORNEY Nov. 4, 1941.  R. W. DE LANCEY  2,261,234
FUEL FEED CONTROL
Filed Aug. 17, 1939   2 Sheets-Sheet 2
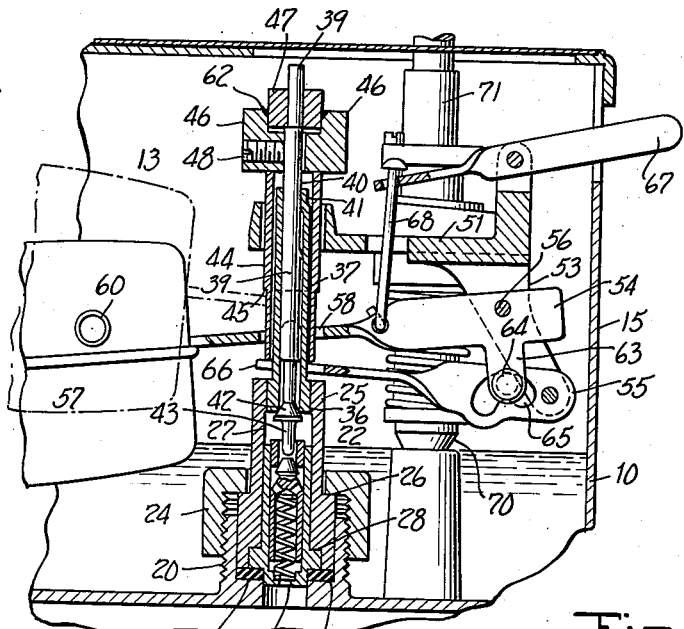
INVENTOR
RALPH W. DeLANCEY
BY
ATTORNEY Patented Nov. 4, 1941

2,261,234

UNITED STATES PATENT OFFICE 2,261,234

FUEL FEED CONTROL

Ralph W. De Lancey, Meriden, Conn., assignor to The Miller Company, Meriden, Conn., a corporation of Connecticut Application August 17, 1939, Serial No. 290,694

28 Claims. (Cl. 137—68)

The present invention relates to fuel feed controls, and is more particularly directed toward a constant level valve controlled by a variably submerged liquid displacement element, such as a float, and adapted for use in the supply line of oil burners and the like.

The present invention contemplates improvements in valve mechanism for controlling the flow of liquid into an intermediate reservoir in the fuel supply line for an oil burner, according to which the liquid is normally maintained at a predetermined level by a float controlled service valve. This service valve normally acts to stop the flow of liquid into the reservoir when the liquid has reached the desired height. Should leakage occur at a rate more rapid than the rate at which the fuel is being used, the liquid displacement element, or float will continue to rise and according to the present invention the continued rise of the same operates a second or emergency valve holding it in closed position due to the buoyancy of the element in the liquid at greater height than normal.

According to the present invention the liquid displacement element, or float can lower from the emergency closing position to the normal operating position upon withdrawal of liquid from the reservoir, and as soon as it lowers a sufficient amount the service valve is automatically opened so as to restore the valve mechanism to normal operation.

The present invention also contemplates that when the float lowers below a predetermined amount either on account of depletion of the fuel supply or loss of buoyancy of the float, the mechanism will be brought into operation to secure a reversal of movement between the float and valve members, whereby further lowering of the float will effect a closing of first the service valve and then the emergency valve.

According to the present invention manual means are provided for lifting the float from the low position to an intermediate position to open both valves so that fluid may flow into the reservoir to a height to again cause the float to function to hold the valves open.

The present invention also contemplates improvements in sequence controlled valves whereby the service valve comprises a complete valve unit adapted to be self-closing when the float operated mechanism is moved upwardly to a sufficient extent to become free from the service valve. In this way the self-closing service valve becomes self-aligned and is entirely free of the float or any extraneous mechanism likely to impair the seating of the valve.

A further object of the present invention is to provide an oil control valve having a preassembled unit embodying the metering valve or valves (except the fixed outlet valve seats) and the float with parts of the mechanism used for the inlet valve whereby assembly operations can be done outside the housing.

Other and further objects of the invention will appear as the description proceeds.

The present invention relates to improvements over those described and claimed in my copending application Serial No. 10,455 filed March 11, 1935 (now Patent No. 2,219,473).

The accompanying drawings show, for purposes of illustrating the present invention, an embodiment in which the invention may take form, together with modifications of certain parts, it being understood that the drawings are illustrative of the invention rather than limiting the same.

In these drawings:

Figure 1 is a central sectional view through a valve mechanism embodying the present invention, showing in full lines the float just below the level at which the service valve closes and showing in dotted lines the position for closure of the service valve;

Figure 2 is a transverse sectional view on the line 2—2 of Figure 1;

Figure 3 is a fragmentary elevational view taken in the direction of the arrow 3 of Figure 1;

Figure 4 is a view similar to Figure 1 showing in full lines the parts in the positions assumed when the liquid has drained away from the reservoir at which time the service and emergency valves become closed and showing in dotted lines the emergency closing position of the float;

Figure 5 is a fragmentary sectional view of the valve mechanisms at an enlarged scale both valves being open;

Figure 6 is a fragmentary sectional view on the line 6—6 of Figure 1; and

Figure 7 is a fragmentary sectional view with parts in elevation illustrating a modified form of inlet valve construction.

In the form of construction shown the body or case for the valve mechanism is in the form of a die casting 10 of generally rectangular shape and having a bottom 11, side walls 12 and 13 and end walls 14 and 15. The bottom has an inlet opening 16 and a chamber 17 for a screen 18. The oil enters through the inlet opening 16, passes through the screen into a passage 19 in the bottom wall 11. The casting forming the body member has an upwardly extending externally threaded boss 20 having a flat seat 21 concentric with the opening 19.

The service and emergency valves above referred to are in the form of a preassembled unit 22 adapted to be inserted into the tubular boss 20 and clamped against a gasket 23 by means of a threaded nut 24. The inlet valve assembly 22 has an outer body 25 shouldered at 26 to fit the clamping nut 24. It has an axial bore 27 and a stop shoulder 28 to fit a second body member 29. This second body member is made accurately to size and is forced against the packing 23 when the nut 24 is tightened. The body member 29 slidably receives a plunger 30 which is urged upwardly by coiled spring 31 carried in the plunger and pressing against the bottom of the body member 29. The oil goes through the inlet passage 32 in the bottom of body 29, the spring chamber, the holes 33 in the plunger and then passes about the head 34 of the plunger 30 and up through a tubular valve seat 35 carried by body member 29.

The outer body member 25 carries an upper tubular valve seat 36 and an upwardly extending tubular valve stem guide 37 apertured, as indicated at 38, so that when the valves are open oil may flow into the reservoir. The valve stem 39 is flattened, as indicated at 40, and the guide 37 is bent in as indicated at 41, so that the stem 39 is non-rotatably guided for vertical reciprocation. The lower end of the stem 37 carries a conical valve member 42 cooperative with the valve seat 37 and an extension 43 adapted to pass down through the valve seat 35 to engage the head 34 of the plunger 30.

The guide 37 is surrounded by a sleeve 44 supported in a manner to be described. This sleeve has a shoulder 45 which, when the float is in the position shown in full lines in Figure 1, is slightly above the float supporting arm to be described. The upper end of the sleeve 44 supports a counterweight having two parts 46 and 47. This counterweight is secured to the stem 39 by a lock screw 48 so that the counterweight acts to open the valves when no force is transmitted from the float to lift the sleeve or valve lifter 44. The adjustment of the counterweight will be described below. The sleeve 44 may be raised by a mechanism to be described so as to lift the weight 46 and valve stem 39 so as to bring the extension 43 away from the lower valve 34 whereupon the lower valve is seated by spring pressure. Further upward movement of the lifting sleeve 44 will bring the upper valve member 42 against its seat. The seating position of the valves is shown in Figure 4, where the float position is indicated in dotted lines.

The walls 12 and 13 of the casing or body member 10 are provided with seats 50 (Figure 2) adapted to support a bridging member 51. This bridging member is apertured, as indicated at 52, to receive the valve lifter 44 and has downwardly extending supports 53 to which are pivoted a float supporting arm 54 and a valve lifting lever 55. The arm 54 is pivoted at 56 and its free end supports a float 57. It is apertured, as indicated at 58, to accommodate the valve stem and associated parts.

The liquid displacement element may be in the form of an air-tight float or may be an open float with holes placed above a normal high level for the oil as indicated at 59 and 60. When the float lifts and rises from the full line position of Figure 1 to the dotted line position of Figure 1, it brings the arm into engagement with the sleeve and thereby raises the valve stem 39. In ordinary operation the valve 34 is effective to stop the flow of liquid and hence the float ordinarily does not rise far enough to bring the upper valve 42 into operation.

When the valve is assembled and tested at the factory the two counterweights 46 and 47 are placed on the stem, the counterweight 47 resting on a shoulder 61 and the counterweight 46 resting on the sleeve 44. The proper amount of fuel is then admitted to the reservoir to bring the fuel to the desired level at which the service valve is to close. This will bring the float supporting arm 54 against the shoulder 45 and the sleeve 44 will raise the outer counterweight 46 upwardly to a height depending upon the exact dimensions of the parts. It is then clamped in position by the set screw 48. There will ordinarily be a slight gap between the bottom of the counterbore in the weight 46 and the bottom of the weight 47 to permit of adjustment of the relative height of the two counterweights. After the adjustment is completed the two counterweights are soldered together as indicated at 62. Should it thereafter be necessary to remove the counterweight for inspection of the valve mechanism it will be possible to restore the counterweight to exactly the same position that it originally occupied, hence the adjustment of the valves will not be impaired.

As shown at the right of Figures 1 and 4 the float arm 54 has a downwardly extending part 63. This extension carries a pin 64 which enters into a slot 65 in the arm 55. When the float is in the position of Figure 1 the arm 55 is in a lower position, as shown. It is bifurcated at the end, as indicated at 66, so as to pass by the guide 37 and under the lower end of the sleeve 44 whereby the sleeve is supported.

When the float rises above the normal operating position the pin 64 traverses the left portion of the slot 65 without actuating the arm 55 enough to cause it to keep up with the valve lifting sleeve 44. When, however, the fuel goes below the normal operating level, on account of failure of supply at the main fuel tank and continued use of the burner or leakage, the float will lower, as indicated in Figure 4. During this movement the pin 64 engages the right-hand portion of the slot 65 and causes the arm 55 to swing upwardly so that the bifucated ends 66 in engagement with the bottom of the sleeve 44 will lift the sleeve and the valve stems so that the valves are closed. This closing of the valves when the main fuel supply has been exhausted makes it impossible for fuel to flow into the reservoir and on through into the burner merely as a consequence of the refilling of the main or supply tank.

In order to restore the valve mechanism into operation one lifts the float from the low position of Figure 4 to an intermediate position by means of a lever 67 and link 68. This will restore the lever 55 to normal, inactive position and allow the weights to open the valves. Liquid will then flow in until it has reached a height sufficient to control the float, after which the float will continue to rise until the regular operation of the valve is available. Should the closure of the valves have been the result of a leaking float it would be impossible to restore the valve to normal operation by means of the lever

67 for as soon as the lever 67 was released the float would proceed to sink and reclose the valves.

The bridge 51 employed in supporting the float and associated parts also supports two metering valves indicated generally at 70. These valves have plungers 71 adapted to be forced downwardly against seats 72 by springs 73. The plungers 71 carry adjusting screws 74 adapted to bear on cams 75 and 76. The details of construction of the metering valves and arrangement of cams form the subject matter of my copending application filed August 17, 1939, Serial No. 290,695.

In assembling the entire valve shown herein it is apparent that the complete valve unit 22 can be reassembled and secured in place by the nut 24. The float, the float operated levers 54 and 55 and the metering valves can all be assembled on the casting 51 as a unit, and this casting may be readily secured in place in the housing by the screws as indicated. The sleeve 44 may then be inserted and the counterweights attached, after which the adjustments may be made.

In the arrangement shown in Figure 7 the valve stem 80 is similar to the valve stem 39, and the sleeve 81 is similar to the sleeve 44, the valve stem and sleeve may be interconnected by the counterweights in the manner above described and the sleeve actuated by levers similar to the levers 54 and 55 as above described so that the valve stem 80 is reciprocated the same as the valve stem 39. In this form of construction the valve stem extends down through a hole 82 in a valve body member 83 and has a ball and socket joint connection 84 with a dangling valve member 85 adapted to cooperate with a seat 86 formed in the valve body member 83. The body member 83 is clamped in place in the boss 87 by means of a nut indicated at 88, gaskets 89 and 90 being employed as indicated.

The body member 83 is counterbored from below and receives an insert 91 which is clamped against the lower gasket. This insert has an axially extending opening 92 adapted to receive a plunger 93 having a ball and socket connection 94 with a lower valve member 95. The plunger is yieldably carried by a coiled spring 96 mounted above the collar 97 on the upper valve member 85, this spring passing through elongated slots 98 in the tubular wall of the insert 91. When the valves are open, as indicated in Figure 7, each valve is below its seat and fuel can flow in through the passage about the lower valve through holes 99 in the insert 91 up about the upper valve member 85 past its seat and through a discharge opening 100. When the float rises the valve stem 80 is carried up and all the parts move in unison until the lower valve member 95 engages its seat, then on account of the overtravel provided by the spring connection it is possible for the float to rise still further and bring the valve member 85 against its seat.

It is obvious that the invention may be embodied in many forms and constructions within the scope of the claims and I wish it to be understood that the particular form shown is but one of the many forms. Various modifications and changes being possible, I do not otherwise limit myself in any way with respect thereto.

What is claimed is:

1. A device for controlling the flow of liquids comprising a reservoir to receive the liquid, an inlet passage through which liquid flows into the reservoir, a valve seat in said passage, a cooperative valve member for opening and closing the passage, said valve member being reciprocable and biased to open position, a float in the reservoir responsive to liquid level therein, a pivoted, float-supporting arm having a lost motion connection with the valve member to shift the valve member to closed position during a predetermined upward movement of the float, and a valve member actuating lever operably connected with the arm to actuate the valve member to closed position during a predetermined lowering of the float through a range of movement substantially lower than that of the upward closing movement.

2. A device such as claimed in claim 1, having a second valve seat below the first, and a float controlled second valve member cooperative with the second seat for closing the passage before the float reaches either extreme position.

3. A device such as claimed in claim 1, having a lever having a lost motion connection with the float supporting arm for lifting the float in the absence of liquid in the reservoir or in response to submersion of the float.

4. A device such as claimed in claim 1, wherein the pivot for the valve member actuating lever is below the arm pivot and farther from the float.

5. A device for controlling the flow of liquids comprising a reservoir to receive the liquid, an inlet passage through which liquid flows into the reservoir, a valve seat in said passage, a cooperative valve member for opening and closing the passage, said valve member being reciprocable and biased to open position, a float in the reservoir responsive to liquid level therein, a pivoted, float-supporting arm having a lost motion connection with the valve member to shift the valve member to closed position during a predetermined upward movement of the float, and a valve member actuating lever having a pin and slot connection with the arm to actuate the valve member to closed position during a predetermined lowering of the float through a range of movement substantially lower than that of the upward closing movement.

6. A device for controlling the flow of liquids comprising a reservoir to receive the liquid, an inlet passage through which liquid flows into the reservoir, a valve seat in said passage, a cooperative valve member for opening and closing the passage, said valve member being vertically movable and biased to open position, a shouldered valve lifter connected to the valve, a float in the reservoir responsive to liquid level therein, a horizontally-extending, pivoted, float-supporting arm engageable with the shoulder on the valve lifter to shift the valve member to closed position during a predetermined upward movement of the float, and a valve member actuating lever operably connected with the arm to actuate the valve member to closed position during a predetermined lowering of the float through a range of movement substantially lower than that of the upward closing movement.

7. A device for controlling the flow of liquids comprising a reservoir to receive the liquid, an inlet passage through which liquid flows into the reservoir, a valve seat in said passage, a cooperative valve member for opening and closing the passage, said valve member being vertically movable and biased to open position, a valve lifter connected to the valve and having two shoulders, a float in the reservoir responsive to liquid level therein, a pivoted, horizontally extending, float-supporting arm engageable with the upper shoulder on the valve lifter to shift the valve member to closed position during a predetermined upward movement of the float, and a valve member actuating lever operably connected with the arm and disposed to engage the other shoulder to actuate the valve member to closed position during a predetermined lowering of the float through a range of movement substantially lower than that of the upward closing movement.

8. A device for controlling the flow of liquids comprising a reservoir to receive the liquid, an inlet passage through which liquid flows into the reservoir, a valve seat in said passage, a cooperative valve member for opening and closing the passage, a vertically extending valve stem, a slidable valve lifting sleeve about the valve stem, a counterbalancing weight secured to the stem adjacent its upper end and providing a stop for the upper end of the sleeve, a float in the reservoir responsive to liquid level therein, a pivoted, float-supporting arm having a lost motion connection with the valve lifting sleeve to bring it against the weight and to shift the valve member to closed position during a predetermined upward movement of the float, and a valve member actuating lever operably connected with the arm to actuate the valve lifting sleeve and weight to move the valve member to closed position during a predetermined lowering of the float through a range of movement substantially lower than that of the upward closing movement.

9. A device for controlling the flow of liquids comprising a chamber to receive liquid, an inlet passage through which liquid flows into the chamber, a valve seat in said passage, a cooperative valve member for opening and closing said passage, said valve member being vertically reciprocable and biased to open position, a valve stem, a float in the chamber on one side of the valve stem and having a supporting arm extending beyond the valve stem, a pivotal support for the arm, a pivoted valve stem lifting lever, and arm-actuated, lever-operating means to lift the valve stem when the float is moved from a predetermined upper position toward a predetermined lower position.

10. In a device for controlling the flow of liquids, a reservoir having an inlet passage with two valve seats in series, a vertically movable weighted valve lifter, valve members cooperable with the seats and controlled by the valve lifter to be seated when the valve lifter is in its upper position and to be opened successively when it is moved toward its lower position, and reseated in reverse sequence upon return to the upper position, an arm pivoted to one side of the valve lifter and carrying a float on the other side of the lifter, the lifter having an abutment engageable with the arm to raise the lifter when the float is in a predetermined range of upward movement, whereby one valve may be closed before the other when the float rises and opened before the other when the float lowers, and supplemental lifter actuating means responsive to lowering of the float to a position substantially below that at which both valves are opened for closing both valves.

11. In a fuel feed control, a float chamber, an inlet passage having downwardly facing upper and lower valve seats in series and through which fuel flows upwardly to enter the chamber, valve members corresponding with and disposed below the valve seats, the valve members normally having a closer spacing than the seats and being interconnected to permit overtravel of the upper valve member relative to the lower valve member, an upwardly extending vertically reciprocable valve stem, a weight on the top of the stem urging the valve members away from their respective seats, a float in the chamber, a valve stem lifter cooperable with the weight and float for lifting the weight and valve stem when the float rises through a predetermined range of movement, the float becoming disconnected from the lifter when it lowers below said range of movements.

12. A fuel feed control such as claimed in claim 11, wherein the valve stem is non-rotatably guided in a fixed bearing.

13. A fuel feed control such as claimed in claim 11, wherein the valve lifter is in the form of a sleeve concentric with the valve stem.

14. A fuel feed control such as claimed in claim 11, having means to reengage the sleeve and lift it when the float is lowered further to a substantially lower level.

15. A fuel feed control such as claimed in claim 11, wherein the weight comprises two parts one of which engages a stop shoulder on the valve stem while the other is secured to the first at an adjusted relative elevation.

16. In a device for controlling the flow of liquids, a reservoir having an inlet passage with two valve seats in series, a float in the reservoir, a valve member cooperative with the first seat in the series for closing the passage, a spring acting on said valve member to move it to closed position, a second valve member cooperative with the second seat in the series for opening and closing the passage, means for operating the second valve member from the float, the second valve member being engageable with the first valve member to hold the latter unseated and stress the spring when the second valve member is a predetermined distance from its seat, the spring causing the first valve member to move toward its seat as the second valve member moves toward its seat, whereupon the second valve member separates from the first valve member so that the first valve member is seated solely by spring pressure.

17. A device such as claimed in claim 16, wherein the valve seats are tubular, and the second valve member has a stem extending through the second seat, and one of the valve members has a stem extending through the other valve seat to engage the other valve member when the second valve member is lowered.

18. A device such as claimed in claim 16, having a tubular guide above the valve seats, a valve stem extending up through the guides, a weight secured to the valve stem, and a slidable sleeve about the guide and operable connected with the float.

19. In a float operated device for controlling the flow of fluids into a float chamber having an inlet opening surrounded by a seat facing toward the chamber, comprising a member having an end adapted to be clamped against said seat and having a stepped bore, an insert fitting the stepped bore and also adapted to be clamped against said seat, the insert having an inlet opening, an outlet valve seat about an outlet opening, and an interposed tubular spring pressed valve member normally in engagement with the valve seat to close the passage, the insert receiving member having a passage extending from the insert into the float chamber, and float operated means acting, when the liquid level is below a predetermined height, to compress the spring and open the valve, so that liquid may flow into the chamber.

20. A device such as claimed in claim 19, wherein the passage between the insert and chamber and the float actuated means includes a valve member cooperative with the second valve seat to open and close the passage when the float is at a higher elevation than when controlling the unseating and seating of the first valve member.

21. In a device for controlling the flow of liquids, a reservoir having an opening in the bottom, a service valve unit comprising a body having an opening in the bottom, a downwardly facing tubular valve seat, an interposed slidable plunger having a valve face cooperative with the valve seat and a tubular bore laterally opening below the valve face, a spring pressing the valve face against the valve seat, and an emergency valve unit comprising a body telescopically receiving the body of the service valve unit and having a downwardly facing valve seat above the service valve unit, and a slidable plunger having a valve face cooperable with the upper valve seat and an element engageable with the plunger of the service valve unit to move it away from its seat after the valve face thereon has been moved away from the upper valve seat.

22. A device such as claimed in claim 21, wherein the body of the emergency valve unit has a tubular guide for the emergency valve plunger, a weight secured to the emergency valve plunger above the tubular guide, and an actuating sleeve outside the tubular guide.

23. A device such as claimed in claim 21, wherein the body of the emergency valve unit has a tubular guide for the emergency valve plunger, a weight secured to the emergency valve plunger above the tubular guide, an actuating sleeve outside the tubular guide, and a float in the reservoir having an arm engageable with the sleeve to actuate the sleeve when the float is in a predetermined range of movement.

24. A device such as claimed in claim 21, wherein the reservoir opening is in the bottom of a tubular externally threaded boss and the body of the emergency valve unit is fitted into the boss and has an upwardly facing shoulder, and having a clamping ring threaded on the boss and bearing on the shoulder.

25. A valve assembly comprising an upwardly facing apertured seat, a tubular member clamped against the seat, the tubular member having a chamber to receive an insert, a downwardly facing valve seat above the chamber, a guide above the valve seat, an outlet port above the valve seat, a valve stem reciprocably carried in the guide and having a valve member below the valve seat and cooperative therewith, and an extension below the valve member, and an insert in the chamber, the insert comprising a tubular body having an axially extending bore through which said extension passes, a spring seat at the bottom, a valve seat at the top and a spring pressed plunger having a valve face to cooperate with the valve seat and passageways for liquid to admit liquid to the outside of the latter mentioned valve face.

26. In a device for controlling liquid flow, a reservoir having an inlet passage and adapted to hold liquid, a movable float therein responsive to liquid height, a movable valve stem lifter adapted to be coupled with the float when the float reaches a predetermined elevation and to be lifted by the float on further rise of the float, a valve stem having a valve member at its lower end cooperative with a valve seat in said passage, and a two part counterweight to balance the float, one part of the counterweight having limited sliding movement along the stem, the other part being adjustably mounted along the stem above the valve stem lifter in a position to be engaged thereby, and being secured to the first part, after adjustment, so that the counterweight can be removed from the stem and restored to the same position.

27. A control mechanism for oil burners comprising a housing having an inlet opening, a self-opening valve for the opening, an outlet valve seat, and a preassembled unit detachably secured in said housing comprising a support, a float movably mounted on the support, float operated means for actuating the inlet valve to closed position in response to float position, an outlet valve member movably carried in the support, spring means urging the outlet valve member against the outlet valve seat, and cam means for holding the outlet valve member in adjusted position relative to the seat.

28. A control mechanism for oil burners comprising a housing having an inlet opening, a self-opening valve for the opening, an outlet valve seat, and a preassembled unit detachably secured in said housing comprising a support, a float movably mounted on the support, float operated means for actuating the inlet valve to closed position in response to a predetermined upper float position, additional float operated means for actuating the inlet valve to closed position in response to a predetermined lower float position, an outlet valve member movably carried in the support, spring means urging the outlet valve member against the outlet valve seat, and cam means for holding the outlet valve member in adjusted position relative to the seat.

RALPH W. DE LANCEY.